United States Patent
Xing et al.

(10) Patent No.: US 8,351,323 B2
(45) Date of Patent: Jan. 8, 2013

(54) METHOD AND APPARATUS FOR TRANSMITTING/RECEIVING A CONTINUOUS PILOT CODE IN A MULTI-CARRIER SYSTEM

(75) Inventors: Guanbin Xing, Beijing (CN); Dong Bai, Beijing (CN); Yibin Liang, Beijing (CN); Qihong Ge, Beijing (CN); Wen Chen, Beijing (CN)

(73) Assignee: TIMI Technologies Co., Ltd., Beijing (CN)

( * ) Notice: Subject to any disclaimer, the term of this patent is extended or adjusted under 35 U.S.C. 154(b) by 1108 days.

(21) Appl. No.: 12/298,679

(22) PCT Filed: Nov. 14, 2006

(86) PCT No.: PCT/CN2006/003049
§ 371 (c)(1),
(2), (4) Date: Oct. 27, 2008

(87) PCT Pub. No.: WO2007/124626
PCT Pub. Date: Nov. 8, 2007

(65) Prior Publication Data
US 2009/0097396 A1    Apr. 16, 2009

(30) Foreign Application Priority Data
Apr. 27, 2006  (CN) .......................... 2006 1 0076071

(51) Int. Cl.
*H04J 11/00*    (2006.01)
(52) U.S. Cl. .......................... 370/210; 370/535; 370/537
(58) Field of Classification Search .................. 370/203, 370/204, 208, 210, 211, 330, 491, 500, 535, 370/537
See application file for complete search history.

(56) References Cited

U.S. PATENT DOCUMENTS

| | | | |
|---|---|---|---|
| 7,356,094 B1 * | 4/2008 | Ikeda et al. | 375/316 |
| 8,121,017 B2 * | 2/2012 | Stadelmeier et al. | 370/203 |
| 2001/0044394 A1 * | 11/2001 | Hagen | 510/141 |
| 2002/0009064 A1 | 1/2002 | Blessent et al. | |
| 2002/0080887 A1 * | 6/2002 | Jeong et al. | 375/295 |
| 2004/0101046 A1 * | 5/2004 | Yang et al. | 375/240.08 |

(Continued)

FOREIGN PATENT DOCUMENTS
CN    1172455 C    10/2004
(Continued)

*Primary Examiner* — Kwang B Yao
*Assistant Examiner* — Nguyen Ngo
(74) *Attorney, Agent, or Firm* — Morgan, Lewis & Bockius LLP

(57) ABSTRACT

The present invention provides a method for transmitting/receiving a continuous pilot code in a multi-carrier system. The method for transmitting comprises: performing a time-frequency domain two dimensional encoding on an information bit stream to be transmitted; mapping the encoded bit stream to obtain a continuous pilot carrying encoding information; multiplexing a load, a discrete pilot and the mapped continuous pilot carrying the encoding information based on distribution of the load, the discrete pilot and the continuous pilot on a sub-carrier, to generate a frequency domain signal; and performing a frequency-time domain transforming on the generated frequency domain signal, to obtain a time domain sample. The method for receiving comprises: extracting the continuous pilot from an active carrier of a multi-carrier signal; and performing a time-frequency domain decoding on the extracted continuous pilots to obtain the decision of transmitted information bits. The invention ensures reliable transmission of the information without using additional bandwidth resource by carrying information in the continuous pilots using an encoding scheme.

9 Claims, 4 Drawing Sheets

U.S. PATENT DOCUMENTS

| | | | |
|---|---|---|---|
| 2004/0190600 A1* | 9/2004 | Odenwalder | 375/147 |
| 2004/0218523 A1 | 11/2004 | Varshney et al. | |
| 2005/0094550 A1* | 5/2005 | Huh et al. | 370/203 |
| 2005/0169166 A1* | 8/2005 | Okada et al. | 370/208 |
| 2006/0018250 A1* | 1/2006 | Gu et al. | 370/208 |
| 2006/0262744 A1* | 11/2006 | Xu et al. | 370/328 |
| 2010/0061223 A1* | 3/2010 | Kim et al. | 370/208 |

FOREIGN PATENT DOCUMENTS

| | | |
|---|---|---|
| CN | 1228950 C | 11/2005 |
| WO | WO-2004100385 | 11/2004 |

\* cited by examiner

METHOD AND APPARATUS FOR TRANSMITTING/RECEIVING A CONTINUOUS PILOT CODE IN A MULTI-CARRIER SYSTEM

BACKGROUND OF THE INVENTION

1. Field of Invention

The present invention relates to a method and an apparatus for transmitting/receiving a signal, particularly to a method and an apparatus for transmitting/receiving a continuous pilot code in a multi-carrier system.

2. Description of Prior Art

In an information transmission system using multiple carriers, it is necessary to add a certain amount of continuous pilots, so that a receiver can perform, for example, a carrier frequency offset tracking and a sample frequency offset tracking.

For a conventional continuous pilot, a known signal is used without carrying any information. In some information transmission systems such as a broadcast system, however, it is often necessary to transmit control information such as a time slot number and a frame number in an extremely low error probability, which can not be achieved by using the conventional continuous pilot.

SUMMARY OF THE INVENTION

The present invention is proposed in order to solve the above problems.

Therefore, one aspect of the present invention provides a method for transmitting/receiving a continuous pilot code in a multi-carrier system.

The method for transmitting comprises: performing a time-frequency domain two dimensional encoding on an information bit stream to be transmitted based on different system frame structures, to obtain an encoded bit stream; mapping the encoded bit stream to obtain a set of continuous pilots carrying encoded information; Multiplexing a load, a discrete pilot and the mapped continuous pilot based on distribution of the load, the discrete pilot and the continuous pilot on a sub-carrier, to generate a frequency domain symbol; and performing a frequency-domain-to-time-domain transform on the frequency domain symbol, to obtain time domain samples.

The method for receiving comprises: extracting the continuous pilots carrying the encoded information from the valid sub-carriers of an OFDM signal; and performing a time-frequency domain decoding on the extracted continuous pilots to obtain decision of transmitted information.

The time-frequency domain two dimensional encoding is to select a portion of pilots from continuous pilots and encode them, and is an encoding scheme including repetition code, Walsh code, RS code and BCH code.

In the mapping step, a signal mapping method including BPSK, QPSK or 16QAM can be used.

In the method for receiving, the continuous pilots carrying the encoded information is decoded by using a diversity scheme including a time-frequency domain diversity and a time domain diversity, and a decision is made on the continuous pilots carrying the encoded information by using a decision scheme including a Walsh decision.

The method for transmitting/receiving the continuous pilot code carrying the encoded information is suitable to a multi-carrier system with a transformation form including Fourier transformation, Walsh transformation, Wavelet transformation.

Another aspect of the present invention provides an apparatus for transmitting/receiving a continuous pilot code in a multi-carrier system.

The apparatus for transmitting comprises: a time-frequency domain encoder for performing a time-frequency domain two dimensional encoding on an information bit stream to be transmitted based on different system frame structures, to obtain an encoded bit stream; a mapper for mapping the encoded bit stream to obtain a set of continuous pilots carrying coded information; a frequency domain signal generator for multiplexing a load, a discrete pilot and the mapped continuous pilot carrying the encoding information based on distribution of the load, the discrete pilot and the continuous pilot on a sub-carrier, to generate a frequency domain signal; and a frequency-domain-to-time-domain transformer for performing a transform on the frequency domain symbol, to obtain time domain samples.

The apparatus for receiving comprises: a time-frequency domain decoder for extracting the continuous pilots from the valid carriers of an OFDM signal; and performing a time-frequency domain decoding on the extracted continuous pilots to obtain decoded information.

The present invention provides a method and apparatus for transmitting and receiving information by using a time-frequency domain two dimensional encoding on the continuous pilots in a multi-carrier digital broadcasting system. In the continuous pilot, the information is carried by using an encoding scheme. It ensures reliable transmission of the information without using additional bandwidth resource. The present invention has the following features of, for example, sufficient utilization of the time-frequency domain diversity, high transmission reliability; no-occupancy of additional bandwidth resource, high spectrum utilization ratio, and flexibility in time-frequency domain encoding scheme. The present invention can be widely applied into many digital broadcasting fields, such as satellite broadcasting, terrestrial wireless broadcasting, and cable broadcasting system.

DETAILED DESCRIPTION OF PREFERRED EMBODIMENTS

Figure 1:
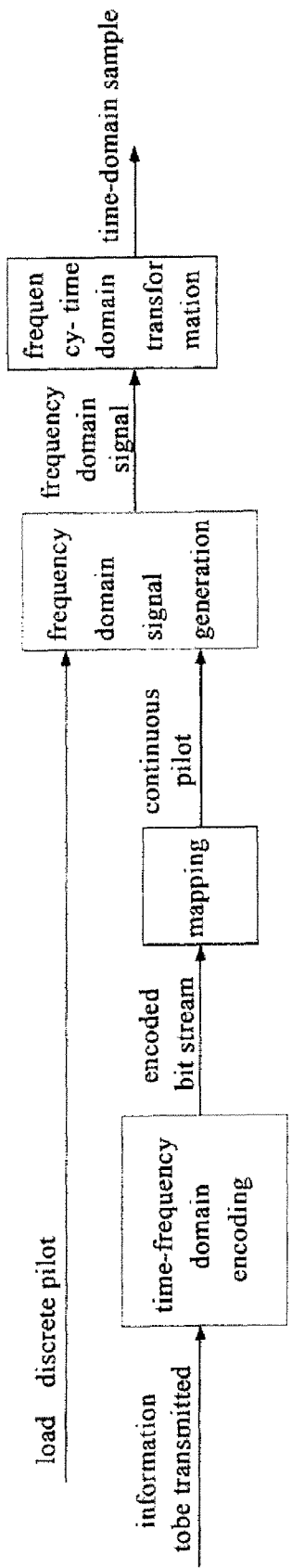
FIG. 1 is a flow diagram illustrating a method for transmitting an OFDM continuous pilot code.

FIG. 1 is a flow diagram illustrating a method for transmitting an OFDM continuous pilot code.

As shown in FIG. 1, the method for transmitting comprises four steps, that is, time-frequency domain encoding, mapping, frequency domain signal generating; and frequency-time domain transforming. A time-frequency domain encoding is performed on an information bit stream to be transmitted based on a system frame structure, to obtain an encoded bit stream. In the mapping step, the encoded bit stream is converted into a continuous pilot carrying encoding information. Subsequently, in the frequency domain signal generating step, a load, a discrete pilot and the continuous pilot are multiplexed based on requirement for distribution of the continuous pilot, the load and the discrete pilot on a sub-carrier, to generate a frequency domain signal. A frequency-time domain transforming is performed on the frequency domain signal, to obtain the desired time domain samples finally.

Figure 2:
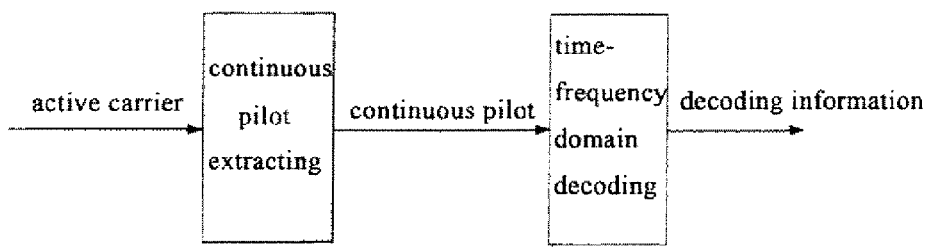
FIG. 2 is a flow diagram illustrating a method for receiving an OFDM continuous pilot code.

FIG. 2 is a flow diagram illustrating a method for receiving an OFDM continuous pilot code.

As shown in FIG. 2, the method for receiving comprises two steps, that is, continuous pilot extracting and time-frequency domain decoding. After a continuous pilot carrying encoded information is extracted from the valid sub-carriers of an OFDMs, a time-frequency domain decoding is performed on the extracted continuous pilot to obtain decoded information.

Hereinafter, in connection with the accompanying figures, the flow diagram for the method of the present invention and a particular implementation for the apparatus of the invention will be illustrated in detail in a preferred embodiment.

The first embodiment of the invention relates to an OFDM-based satellite broadcasting system. A transmission structure for the system comprises three layers: super frame, frame and OFDM symbol. Each super-frame includes 5 frames. Each frame comprises 10 time slots. Each time slot comprises 42 OFDM symbols. In addition to a frame number and a time slot number, furthermore, an identifier indicating "whether a control channel of the next frame is changed" needs to be transmitted. For the above information, it is necessary to transmit 8 bits, as shown in a table 1 below.

TABLE 1

| | control information list | | |
|---|---|---|---|
| bit | 0-2 | 3-6 | 7 |
| information | frame number | time slot number | whether a control channel of the next frame is changed |

A sampling rate for the broadcasting system of the present embodiment is 10M Hz. Via a 4096-point IFFT, 3077 sub-carriers are allocated within 7.51 MHz bandwidth, including one dummy sub-carrier, 48 continuous pilots, 384 discrete pilots, and 2644 load sub-carriers. For each OFDM symbol, the system selects 32 continuous pilots from 48 continuous pilots, and transmits 8-bit information by using a fourfold repetition code scheme. In time domain, a 42-fold repetition code scheme is adopted for 42 OFDM symbols in each time slot, in order to transmit the above 48 continuous pilots.

The transmitting of the continuous pilot code in the present broadcasting system comprises four portions, that is, a time-frequency domain encoding portion, a mapping portion, a frequency domain signal generating portion; and frequency-time domain transforming portion.

Figure 3:
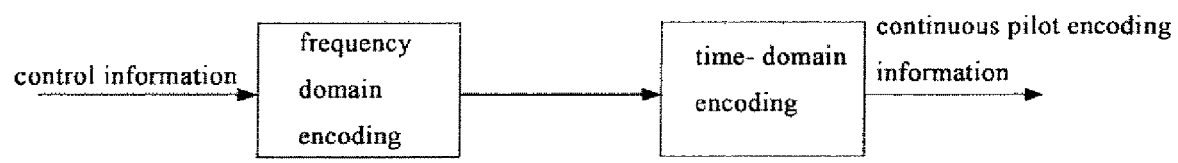
FIG. 3 is a diagram illustrating a structure for a time-frequency domain encoder.

FIG. 3 is a diagram illustrating a structure for a time-frequency domain encoder.

As shown in FIG. 3, the time-frequency domain encoder includes a frequency domain encoding portion and a time domain encoding portion. 8-bit control information x(n) to be transmitted is input into the frequency domain encoder, wherein $0 \leq n \leq 7$. By using the fourfold repetition encoding, the frequency domain encoder places the 8-bit control information onto the 1st-16th bits and the 31st-46th bits, to thus obtain an output of the encoded 48-bit information y(n) as below, wherein $0 \leq n \leq 47$.

$$y(n) = \begin{cases} x(n-1), & 1 \leq n \leq 8 \\ x(n-9), & 9 \leq n \leq 16 \\ x(n-31), & 31 \leq n \leq 38 \\ x(n-39), & 39 \leq n \leq 46 \\ 0, & \text{others,} \end{cases}$$

$$0 \leq n \leq 47$$

Subsequently, the output information y(n) from the frequency domain encoder is input into the time domain encoder. The time domain encoder outputs z(m, n)=y(n), wherein $0 \leq m \leq 41$ and $0 \leq n \leq 47$. The z(m, n) represents the nth continuous pilot for the mth OFDM symbol.

Figure 4:
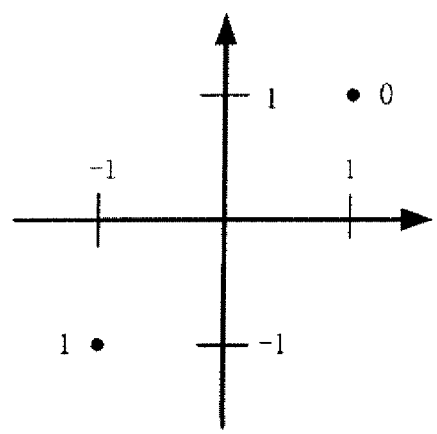
FIG. 4 is a diagram illustrating mapping for BPSK constellation.

FIG. 4 is a diagram illustrating mapping for BPSK constellation.

As shown in FIG. 4, by using a BPSK mapping scheme, a mapper module maps the encoded bit stream information into a constellation point. A normalization power factor is $\sqrt{2}/2$.

Figure 5:
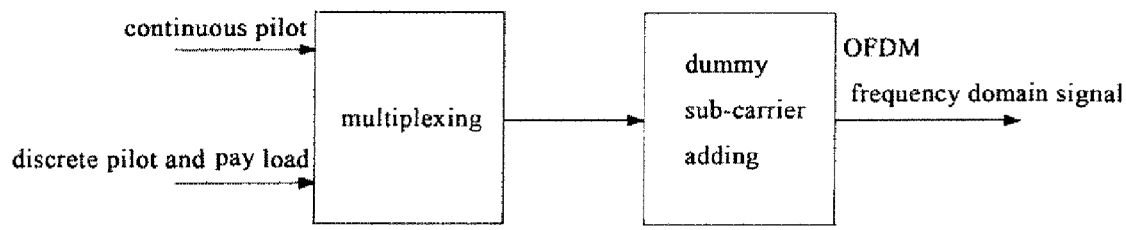
FIG. 5 is a diagram illustrating a structure for a frequency domain symbol generation module.

FIG. 5 is a diagram illustrating a structure for a frequency domain symbol generation module.

A shown in FIG. 5, the frequency domain symbol generation module includes a multiplexing portion and a dummy sub-carrier adding portion.

Signals input into the multiplexing portion include 48 continuous pilot signals subjected to the constellation mapping, 3028 discrete pilots and loads. Each OFDM signal obtained by the multiplexing has 3076 valid sub-carriers, including 48 continuous pilots, 384 discrete pilots and 2644 loads. 3076 valid sub-carrier signals are formed by the multiplexing. The continuous pilots are placed onto the 0th, 32nd, 86th, 184th, 324th, 380th, 424th, 544th, 564th, 600th, 650th, 720th, 832nd, 990th, 1044th 1096th, 1164th, 1232nd, 1292nd, 1352nd, 1444th, 1498th, 1510th, 1537th, 1538th, 1564th, 1576th, 1630th, 1722nd, 1782nd, 1842nd, 1910th, 1978th, 2030th, 2084th, 2242nd, 2354th, 2424th, 2474th, 2510th, 2530th, 2650th, 2694th, 2750th, 2912th, 2988th, 3042nd, and 3075th points.

The virtual sub-carrier adding portion then adds 1020 virtual sub-carriers into an OFDM frequency domain signal output from the multiplexing portion, to thus obtain 4096-point OFDM frequency domain signal.

Assuming that a signal for the valid sub-carrier is a(m, n), and a signal for the OFDM frequency domain signal is b(m, n), the mapping between them is shown in the following formula.

$$b(m, n) = \begin{cases} a(m, n-1), & 1 \leq n \leq 1538 \\ a(m, n-1020), & 2558 \leq n \leq 4095 \\ 0, & n = 0 \text{ or } 1539 \leq n \leq 2557, \end{cases}$$

$$0 \leq m \leq 41$$

Figure 6:
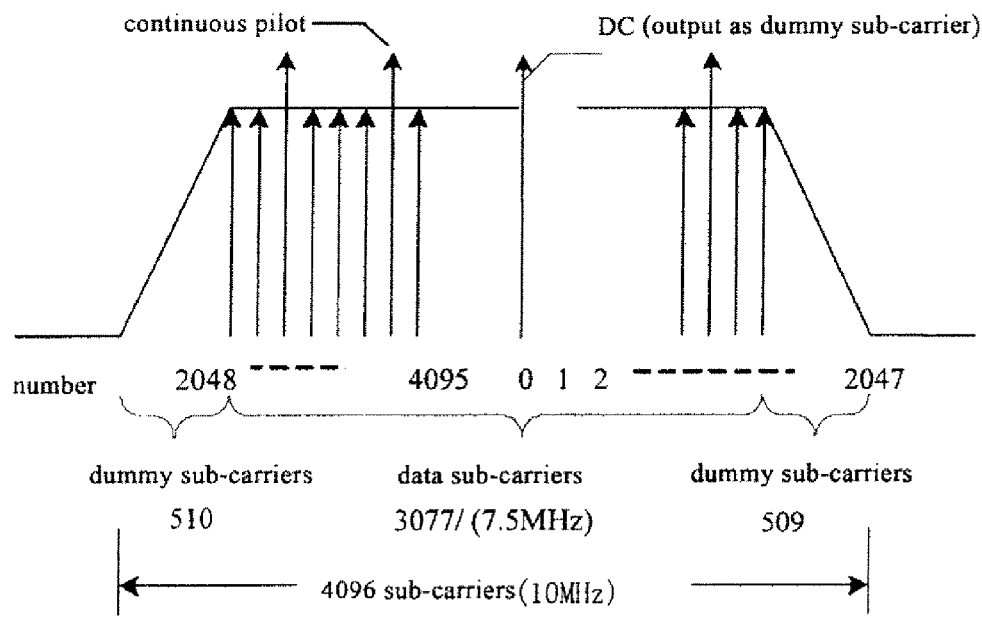
FIG. 6 is a diagram illustrating a sub-carrier structure for a frequency domain signal.

The sub-carrier structure for the generated 4096-points OFDM frequency domain symbol is shown in FIG. 6. A direct current signal and 1019 high frequency sub-carriers are used as virtual sub-carriers.

The last portion for the system is a frequency-domain-to-time-domain transformation portion. In the present embodiment a discrete inverse Fourier transform is used to transform the frequency domain signal onto the time domain, to thus obtain an ultimate time domain sampling signal as below.

$$c(k) = IFFT[b(n)] = \frac{1}{4096} \sum_{n=0}^{4095} b(n) \cdot e^{j2\pi nk/4096}, 0 \le k \le 4095$$

The receiving of the continuous pilot code in the present broadcasting system comprises two portions, that is, a continuous pilot extracting portion and a time-frequency domain decoding portion.

The continuous pilot extracting portion functions to extract constellation points on the 0th, 32nd, 86th, 184th, 324th, 380th, 424th, 544th, 564th, 600th, 650th, 720th, 832nd, 990th, 1044th, 1096th, 1164th, 1232nd, 1292nd, 1352nd, 1444th, 1498th, 1510th, 1537th, 1538th, 1564th, 1576th, 1630th, 1722nd, 1782nd, 1842nd, 1910th, 1978th, 2030th, 2084th, 2242nd, 2354th, 2424th, 2474th, 2510th, 2530th, 2650th, 2694th, 2750th, 2912th, 2988th, 3042nd, and 3075th sub-carriers from the 3076 active sub-carriers obtained by 42 OFDM signal after channel balance, that is, 48 complex continuous pilots r(m, n), wherein m represents an OFDM signal number and $0 \le m \le 41$, and n represents a continuous pilot number and $0 \le n \le 47$.

Figure 7:
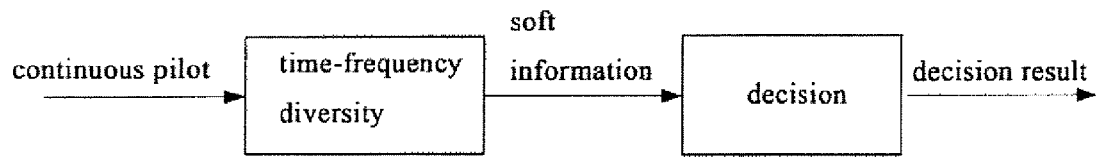
FIG. 7 is a diagram illustrating a structure for a time-frequency domain decoder.

The time-frequency domain decoding portion is shown as in FIG. 7. As shown, the time-frequency domain decoder includes two portions, that is, a time-frequency domain diversity module and a decision module.

The time-frequency domain diversity module obtains soft information according to the input continuous pilots.

$$p(n) = \text{Re}\left[\sum_{m=0}^{41} \binom{r(m, n+1) + r(m, n+9) +}{r(m, n+31) + r(m, n+39)}\right] + \text{Im}\left[\sum_{m=0}^{41} \binom{r(m, n+1) + r(m, n+9) +}{r(m, n+31) + r(m, n+39)}\right],$$

wherein $0 \le n \le 7$, Re[ ] takes a real part of a complex number, and Im[ ] takes a imaginary part of a complex number.

The decision module performs sign decision on the above soft information, to thus obtain the 8-bit decision value of transmitted information.

$$q(n) = \begin{cases} 0, & p(n) > 0 \\ 1, & \text{Others} \end{cases}, 0 \le n \le 7$$

The second embodiment of the present invention relates to a case wherein the two portions of the first embodiment, that is, the time-frequency domain encoding portion and the time-frequency domain decoding portion, are changed.

Figure 8:
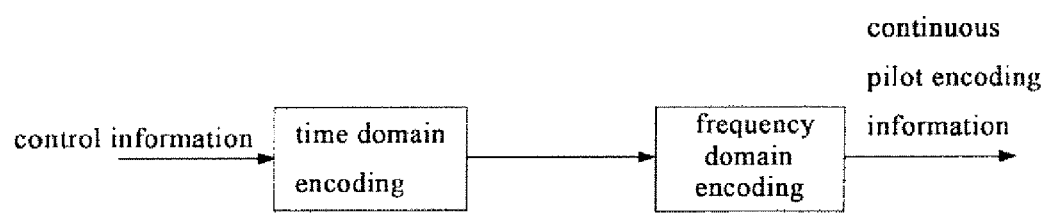
FIG. 8 is a diagram illustrating another structure for a time-frequency domain encoder.

FIG. 8 is a diagram illustrating another structure for a time-frequency domain encoder.

As shown in FIG. 8, in the time-frequency domain encoding, the system firstly uses a time domain encoding and then uses a frequency domain encoding.

The control information x(floor(m/4)) to be transmitted is input into a time domain encoding portion, wherein $0 \le m \le 31$. After 8-bit control information is placed on the first 32 OFDM symbols among 42 OFDM symbols by using the fourfold repetition code scheme, y(m) is output as below.

$$y(m) = \begin{cases} x(\text{floor}(m/4)), & 0 \le m \le 31 \\ 0, & 32 \le m \le 41 \end{cases}, 0 \le m \le 41$$

The y(m) is input into a frequency domain encoding portion. A Walsh code is adopted on the 1st-16th and 31st-46th sub-carriers, that is, Walsh(0)=00000000000000000000-000000000000, 0 for other sub-carriers, and Walsh(1)=0101010101010101010101010101010101. The frequency domain encoding portion outputs as below.

$$z(m, n) = \begin{cases} \text{Walsh}(y(m)), & 1 \le n \le 16, 31 \le n \le 46 \\ 0, & n = 0, 17 \le n \le 30, n = 47 \end{cases}, 0 \le m \le 41$$

Figure 9:
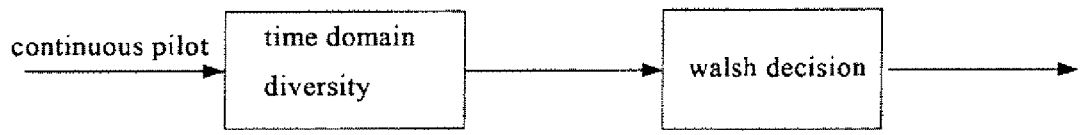
FIG. 9 is a diagram illustrating another structure for a time-frequency domain decoder.

FIG. 9 is a diagram illustrating another structure for a time-frequency domain decoder.

As shown in FIG. 9, in the time-frequency domain decoder, a time domain diversity is firstly performed on the received continuous pilots, and then a Walsh decision is performed, to thus obtain the required information bit stream.

A time domain diversity portion extracts pilots in the first 32 OFDM signals from the received continuous pilots, and performs a time domain diversity as below according to the fourfold repetition code.

$$p(m,n) = r(4*m,n) + r(4*m+1,n) + r(4*m+2,n) + r(4*m+3,n), 0 \le m \le 7, 0 \le n \le 47$$

A Walsh decision portion firstly calculates a likelihood value for Walsh(0) and Walsh(1) with respect to each bit.

$$q_0(m) = \text{Re}\left[\sum_{n=1}^{16} p(m, n) + \sum_{n=31}^{46} p(m, n)\right] + \text{Im}\left[\sum_{n=1}^{16} p(m, n) + \sum_{n=31}^{46} p(m, n)\right], 0 \le m \le 7$$

$$q_1(m) = \text{Re}\begin{bmatrix} \sum_{n=0}^{7} p(m, 2*n+1) - \\ \sum_{n=0}^{7} p(m, 2*n+2) + \\ \sum_{n=0}^{7} p(m, 2*n+31) - \\ \sum_{n=0}^{7} p(m, 2*n+32) \end{bmatrix} + \text{Im}\begin{bmatrix} \sum_{n=0}^{7} p(m, 2*n+1) - \\ \sum_{n=0}^{7} p(m, 2*n+2) + \\ \sum_{n=0}^{7} p(m, 2*n+31) - \\ \sum_{n=0}^{7} p(m, 2*n+32) \end{bmatrix},$$

$$0 \le m \le 7$$

A decision is then made as below according to the calculated likelihood value.

$$t(m) = \begin{cases} 0, & q_0(m) > q_1(m) \\ 1, & \text{others,} \end{cases}, 0 \le m \le 7$$

Therefore, the time-frequency domain decoding process is finished.

As above, the implementation for the present invention is illustrated according to the preferable embodiments. However, the present invention is not limited to the above specific embodiments. As obvious to those skilled in the art, any change or variation to the present invention is possible without departing from the spirit and scope of the present invention.

What is claimed is:

1. A method for transmitting/receiving a continuous pilot code in a multi-carrier system, the method for transmitting comprising:
performing a time-frequency domain two dimensional encoding on an information bit stream to be transmitted based on different system frame structures, to obtain an encoded bit stream;
mapping the encoded bit stream to obtain a set of continuous pilots carrying encoded information;
multiplexing a load, a discrete pilot and the continuous pilot based on distribution of the load, the discrete pilot and the mapped continuous pilot on a sub-carrier, to generate a frequency domain signal; and
performing a frequency-domain-to-time-domain transform on the frequency domain symbol, to obtain time domain samples;
wherein the time-frequency domain two dimensional encoding includes selecting a part of pilots from continuous pilots and encoding them;
the method for receiving comprising:
extracting the continuous pilots from the valid sub-carriers of a multi-carrier signal; and performing a time-frequency domain decoding on the extracted continuous pilots to obtain decoded information.

2. The method for transmitting/receiving the continuous pilot code in the multi-carrier system according to claim 1, wherein the time-frequency domain two dimensional encoding is an encoding scheme including repetition code, Walsh code, RS code and BCH code.

3. The method for transmitting/receiving the continuous pilot code in the multi-carrier system according to claim 1, wherein in the mapping step, a signal mapping method including BPSK, QPSK and 16QAM is used.

4. The method for transmitting/receiving the continuous pilot code in the multi-carrier system according to claim 1, adapted for a multi-carrier system with a transform including Fourier transformation, Walsh transformation, Wavelet transformation.

5. The method for transmitting/receiving the continuous pilot code in the multi-carrier system according to claim 1, wherein in the method for receiving, the continuous pilot is decoded by using a diversity scheme including a time-frequency domain diversity and a time domain diversity.

6. The method for transmitting/receiving the continuous pilot code in the multi-carrier system according to claim 1, wherein in the method for receiving, a decision is made on the continuous pilot by using a decision scheme including a Walsh decision.

7. The method for transmitting/receiving the continuous pilot code in the multi-carrier system according to claim 1, adapted for a digital broadcasting system including satellite broadcasting, terrestrial wireless broadcasting, and terrestrial broadcasting for handheld.

8. An apparatus for transmitting/receiving a continuous pilot code in a multi-carrier system, the apparatus for transmitting comprising:
a time-frequency domain encoder for performing a time-frequency domain two dimensional encoding on an information bit stream to be transmitted based on different system frame structures, to obtain an encoded bit stream;
a mapper for mapping the encoded bit stream to obtain a set of continuous pilots carrying coded information bits;
a frequency domain signal generator for multiplexing a load, a discrete pilot and the mapped continuous pilot based on distribution of the load, the discrete pilot and the continuous pilot on a sub-carrier, to generate a frequency domain signal; and
a frequency-time domain transformer for performing a frequency-domain-to-time-domain transform on the frequency domain symbol, to obtain time domain samples;
wherein the time-frequency domain two dimensional encoding includes selecting a part of pilots from continuous pilots and encoding them;
the apparatus for receiving comprising:
a time-frequency domain decoder for extracting the continuous pilots from the valid sub-carriers of an OFDM signal; and performing a time-frequency domain decoding on the extracted continuous pilots to obtain decision of transmitted information bits.

9. The apparatus for transmitting/receiving the continuous pilot code in the multi-carrier system according to claim 8, adapted for a digital broadcasting system including satellite broadcasting, terrestrial wireless broadcasting, and terrestrial broadcasting for handheld.

* * * * *